(12) United States Patent
Yeager et al.

(10) Patent No.: US 8,769,928 B2
(45) Date of Patent: Jul. 8, 2014

(54) EXHAUST SYSTEM HAVING CROSS-SENSITIVE SENSOR

(75) Inventors: Mary L. Yeager, Lafayette, IN (US); Christopher L. Wynkoop, Eureka, IL (US); Amit Jayachandran, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 928 days.

(21) Appl. No.: 12/891,264

(22) Filed: Sep. 27, 2010

(65) Prior Publication Data

US 2012/0073265 A1 Mar. 29, 2012

(51) Int. Cl.
*F01N 3/20* (2006.01)

(52) U.S. Cl.
USPC ............................................. 60/276; 60/295

(58) Field of Classification Search
USPC .............................. 60/276, 286, 295, 301, 303
See application file for complete search history.

(56) References Cited

U.S. PATENT DOCUMENTS

| | | |
|---|---|---|
| 4,963,332 A | 10/1990 | Brand et al. |
| 6,017,503 A | 1/2000 | Kato et al. |
| 6,455,009 B1 | 9/2002 | Kato et al. |
| 2005/0282285 A1 | 12/2005 | Radhamohan et al. |
| 2009/0266058 A1 | 10/2009 | Kesse et al. |

FOREIGN PATENT DOCUMENTS

| | | |
|---|---|---|
| EP | 2000641 | 12/2008 |
| WO | WO 2006000877 | 1/2006 |
| WO | WO 2008009940 | 1/2008 |
| WO | WO 200904255 | 7/2009 |

*Primary Examiner* — Kenneth Bomberg
*Assistant Examiner* — Jonathan Matthias
(74) *Attorney, Agent, or Firm* — Finnegan, Henderson, Farabow, Garrett & Dunner LLP (57) ABSTRACT

An exhaust system for use with a combustion engine is disclosed. The exhaust system may have an exhaust passage, a reduction catalyst disposed within the exhaust passage, and an injection device configured to inject reductant into the exhaust passage. The exhaust system may also have a sensor configured to generate a signal indicative of a concentration of an exhaust constituent and the reductant, and a controller in communication with the sensor and the injection device. The controller may be configured to make a comparison of a value indicative of a rate of change of the signal for a period of time with a threshold amount, and make a determination of whether the sensor is sensing a concentration of the exhaust constituent or the reductant based on the comparison. The controller may also be configured to adjust operation of the injection device based on the determination.

18 Claims, 3 Drawing Sheets

EXHAUST SYSTEM HAVING CROSS-SENSITIVE SENSOR

TECHNICAL FIELD

The present disclosure is directed to an exhaust system and, more particularly, to an exhaust system having a sensor that is cross-sensitive to $NO_X$ and $NH_3$.

BACKGROUND

Internal combustion engines, including diesel engines, gasoline engines, gaseous fuel-powered engines, and other engines known in the art exhaust a complex mixture of air pollutants. These air pollutants are composed of gaseous compounds such as, for example, the oxides of nitrogen ($NO_X$). Due to increased awareness of the environment, exhaust emission standards have become more stringent, and the amount of $NO_X$ emitted from an engine may be regulated depending on the type of engine, size of engine, and/or class of engine. In order to ensure compliance with the regulation of these compounds, some engine manufacturers have implemented a strategy called Selective Catalytic Reduction (SCR).

SCR is a process where gaseous or liquid reductant (most commonly a solution of urea solid and water) is added to the exhaust gas stream of an engine and is adsorbed onto a catalyst. The reductant reacts with $NO_X$ in the exhaust gas to form $H_2O$ and $N_2$, which can be safely released to the atmosphere. Although SCR can be an effective method for reducing $NO_X$, it can be difficult to ensure that enough reductant has been injected to adequately reduce the amount of $NO_X$ present within the exhaust gas stream, without unnecessarily wasting reductant and releasing unused reductant or byproducts thereof to the atmosphere.

To help control the amount of $NO_X$ emitted to the atmosphere, most exhaust systems are equipped with a sensor that detects the level of $NO_X$ in the tailpipe of an engine and generates a corresponding signal. Based on this signal, the amount of reductant injected into an exhaust flow can then be trimmed to precisely reduce a desired amount of $NO_X$.

Although relatively successful at helping to control the amount of $NO_X$ emitted to the atmosphere, most $NO_X$ sensors currently available are cross-sensitive to the reductant used to reduce $NO_X$. That is, $NO_X$ sensors on the market today generate signals indicative of the presence of both $NO_X$ and reductant. As such, when either $NO_X$ or reductant levels in an exhaust flow go up, the signal value from the corresponding $NO_X$ sensor also goes up, and vice versa. Thus, it can be difficult to determine which constituent is currently being detected by the sensor, and over-injecting of reductant can occur in some situations when the injections are unknowingly based on a detected high level of reductant instead of $NO_X$.

One attempt to help ensure that reductant injections are correctly based on detected levels of $NO_X$ is described in WO Publication Number 2006/000877 of Crane et al. that published on Jan. 5, 2006 (the '877 publication). The '877 publication discloses an exhaust system that utilizes a nonselective $NO_X/NH_3$ sensor in conjunction with feedforward and feedback control. The sensor is periodically interrogated by introducing a positive pulse in an ammonia feed rate. A positive response from the sensor to the positive pulse indicates ammonia slip is occurring (i.e., that the sensor is currently detecting $NH_3$). A negative response from the sensor indicates $NO_X$ breakthrough (i.e., that the sensor is currently detecting $NO_X$). Based on the positive responses, a controller inhibits feedforward control for a time and reduces reductant injections. Based on the negative response, the controller adjusts feedforward control to increase reductant injections. Feedback control is utilized between sensor interrogations to trim feedforward commands for injection based on sensor output under normal conditions.

Although perhaps somewhat effective at determining if a sensor is detecting $NO_X$ or $NH_3$, the exhaust system of the '877 publication may be unresponsive and wasteful. That is, the exhaust system of the '877 publication requires dedicated time for the sensor to be interrogated, this time causing delays in normal operations of the system. In addition, the exhaust system of the '877 publication requires extra pulses of reductant that are used only for sensor interrogation (i.e., the pulses do not help to reduce $NO_X$), which can be expensive and decrease a time between servicing because of the additional exposure to reductant.

The exhaust system of the present disclosure solves one or more of the problems set forth above and/or other problems of the prior art.

SUMMARY

One aspect of the present disclosure is directed to an exhaust system for use with a combustion engine. The exhaust system may include an exhaust passage, a reduction catalyst disposed within the exhaust passage, and an injection device configured to inject reductant into the exhaust passage upstream of the reduction catalyst. The reductant may be selected to facilitate within the reduction catalyst a reduction of an exhaust constituent. The exhaust system may also include a sensor configured to generate a signal indicative of a concentration of the exhaust constituent and the reductant within the exhaust passage, and a controller in communication with the sensor and the injection device. The controller may be configured to make a comparison of a value indicative of a rate of change of the signal for a period of time with a threshold amount, and make a determination of whether the sensor is sensing a concentration of the exhaust constituent or the reductant based on the comparison. The controller is further configured to adjust operation of the injection device based on the determination.

Another aspect of the present disclosure is directed to a method of operating an exhaust system. The method may include directing a flow of exhaust from a combustion engine through a reduction catalyst, injecting reductant into the flow of exhaust to reduce a constituent of the exhaust, sensing a concentration of the constituent and the reductant, and generating a corresponding signal. The method may further include making a comparison of a value indicative of a rate of change of the signal for a period of time with a threshold amount, and making a determination of whether the concentration of the constituent or the reductant is currently being sensed based on the comparison. The method may additionally include adjusting the injecting based on the determination.

DETAILED DESCRIPTION

Figure 1:
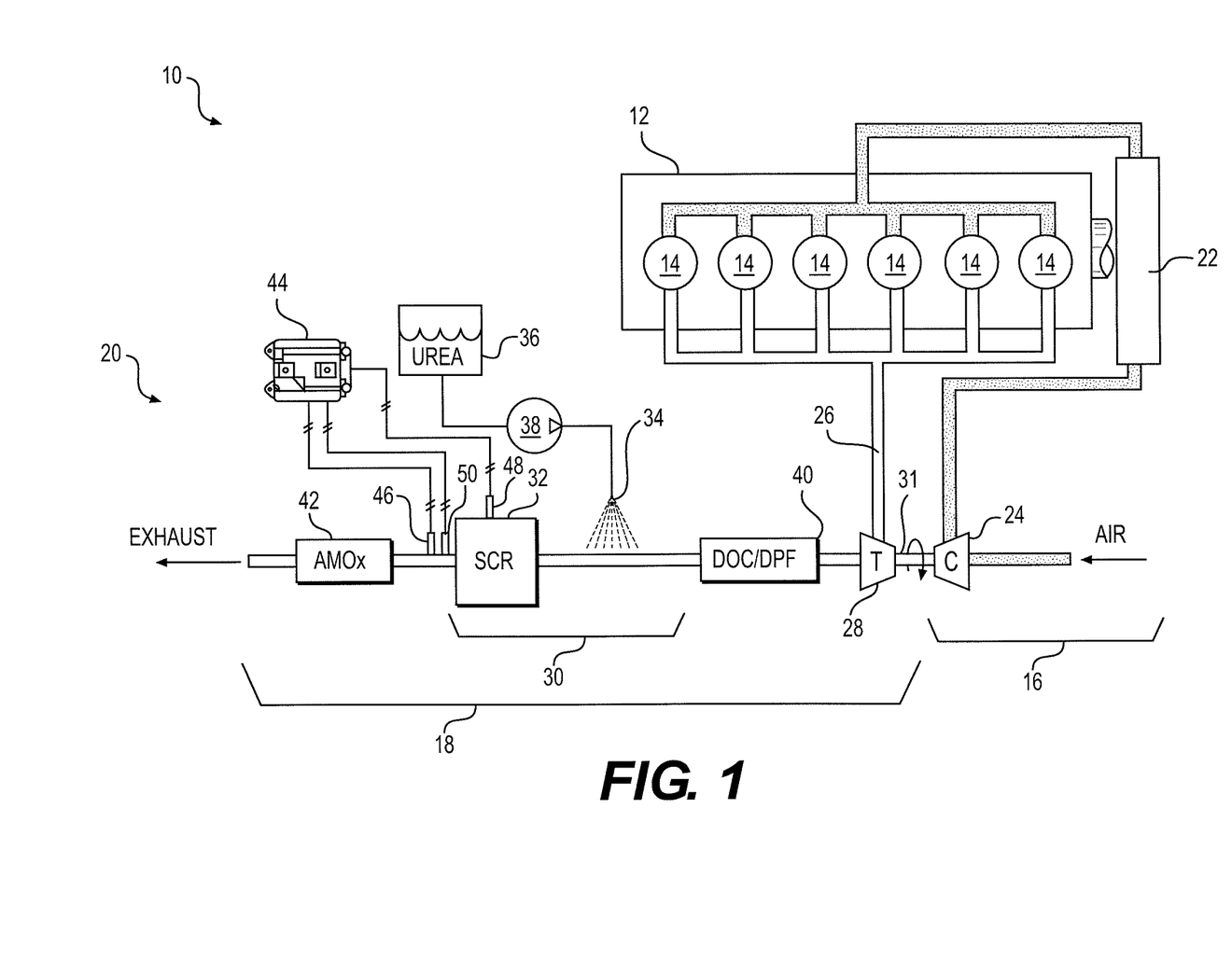
FIG. 1 is a schematic and diagrammatic illustration of an exemplary disclosed power system.

FIG. 1 illustrates an exemplary power system 10. For the purposes of this disclosure, power system 10 is depicted and described as a diesel-fueled, internal combustion engine. However, it is contemplated that power system 10 may embody any other type of combustion engine such as, for example, a gasoline engine or a gaseous fuel-powered engine burning compressed or liquefied natural gas, propane, or methane. Power system 10 may include an engine block 12 that at least partially defines a plurality of combustion chambers 14. It is contemplated that power system 10 may include any number of combustion chambers 14 and that combustion chambers 14 may be disposed in an "in-line" configuration, a "V" configuration, or any other conventional configuration.

Multiple separate sub-system may be included within power system 10. For example, power system 10 may include an air induction system 16, an exhaust system 18, and a control system 20. Air induction system 16 may be configured to direct air or an air and fuel mixture into combustion chambers 14 of power system 10 for subsequent combustion. Exhaust system 18 may exhaust byproducts of the combustion to the atmosphere. Control system 20 may regulate operations of air induction and exhaust systems 16, 18 to reduce the production of regulated constituents and their discharge to the atmosphere.

Air induction system 16 may include multiple components that cooperate to condition and introduce compressed air into combustion chambers 14. For example, air induction system 16 may include an air cooler 22 located downstream of one or more compressors 24. Compressors 24 may be connected to pressurize inlet air directed through cooler 22. A throttle valve (not shown) may be located upstream and/or downstream of compressors 24 to selectively regulate (i.e., restrict) the flow of inlet air into power system 10. A restriction may result in less air entering power system 10 and, thus, affect an air-to-fuel ratio of power system 10. It is contemplated that air induction system 16 may include different or additional components than described above such as, for example, variable valve actuators associated with each combustion chamber 14, filtering components, compressor bypass components, and other known components that may be controlled to affect the air-to-fuel ratio of power system 10, if desired. It is further contemplated that compressors 24 and/or cooler 22 may be omitted, if a naturally aspirated power system 10 is desired.

Exhaust system 18 may include multiple components that condition and direct exhaust from combustion chambers 14 to the atmosphere. For example, exhaust system 18 may include an exhaust passage 26, one or more turbines 28 driven by the exhaust flowing through passage 26, and a reduction catalyst 30 fluidly connected within passage 26 at a location downstream of turbines 28. It is contemplated that exhaust system 18 may include different or additional components than described above such as, for example, bypass components, an exhaust compression or restriction brake, an attenuation device, additional exhaust treatment devices, and other known components, if desired.

Each turbine 28 may be located to receive exhaust discharged from combustion chambers 14, and may be connected to one or more compressors 24 of air induction system 16 by way of a common shaft 31 to form a turbocharger. As the hot exhaust gases exiting power system 10 move through turbine 28 and expand against vanes (not shown) thereof, turbine 28 may rotate and drive the connected compressor 24 to pressurize inlet air. In one embodiment, turbine 28 may be a variable geometry turbine (VGT) or include a combination of variable and fixed geometry turbines. VGTs are a type of turbocharger having geometry adjustable to attain different aspect ratios, such that adequate boost pressure may be supplied to combustion chambers 14 under a range of operational conditions. As a flow area of turbine 28 changes, the air-to-fuel ratio and thus the performance of power system 10 may also change. Alternatively, a fixed geometry turbocharger having an electronically controlled wastegate may be included, if desired.

Reduction catalyst 30 may receive exhaust from turbine 28 and reduce constituents of the exhaust to innocuous gases. In one example, reduction catalyst 30 may embody a Selective Catalytic Reduction (SCR) device having a catalyst substrate 32 located downstream from an injection device 34. A pressurized gaseous or liquid reductant, most commonly urea $(NH_2)_2CO$, a water/urea mixture, a hydrocarbon (e.g., diesel fuel), or ammonia gas ($NH_3$), may be advanced into the exhaust upstream of catalyst substrate 32 by injection device 34. For this purpose, an onboard reductant supply 36 and a pressurizing device 38 may be associated with injection device 34 to provide the pressurized reductant. As the injected reductant is adsorbed onto the surface of catalyst substrate 32, the reductant may react with NOx (NO and $NO_2$) in the exhaust gas to form water ($H_2O$) and diatomic nitrogen ($N_2$). The reduction process performed by catalyst 30 may be most effective when a concentration of NO to $NO_2$ supplied to reduction catalyst 30 is about 1:1.

To help provide the correct concentration of NO to $NO_2$, an oxidation catalyst 40 may be located upstream of reduction catalyst 30, in some embodiments. Oxidation catalyst 40 may be, for example, a diesel oxidation catalyst (DOC). As a DOC, oxidation catalyst 40 may include a porous ceramic honeycomb structure or a metal mesh substrate coated with a material, for example a precious metal, that catalyzes a chemical reaction to alter the composition of the exhaust. For example, oxidation catalyst 40 may include palladium, platinum, vanadium, or a mixture thereof that facilitates the conversion of NO to $NO_2$. In an alternative embodiment, oxidation catalyst 40 may also perform particulate trapping functions (i.e., oxidation catalyst 40 may be a catalyzed particulate trap such as a continuously regenerating trap (CRT) or a catalyzed continuously regenerating trap (CCRT)).

During operation of power system 10, it may be possible for too much urea to be injected into the exhaust (i.e., urea in excess of that required for appropriate $NO_X$ reduction). In this situation, known as "ammonia slip", some amount of ammonia may pass through catalyst substrate 32 to the atmosphere, if not otherwise accounted for. To minimize the magnitude of ammonia slip, another oxidation catalyst 42 may be located downstream of reduction catalyst 30. Oxidation catalyst 42 may include a substrate coated with a catalyst that oxidizes residual $NH_3$ in the exhaust to form water and diatomic nitrogen. It is contemplated that oxidation catalyst 42 may be omitted, if desired.

Control system 20 may include components configured to regulate the treatment of exhaust from power system 10 prior to discharge to the atmosphere. Specifically, control system 20 may include a controller 44 in communication with one or more constituent sensors 46, one or more temperature sensors 48, a flow meter 50, and with injection device 34. Based on input from constituent sensor 46, temperature sensor 48, and flow meter 50, controller 44 may determine an amount of $NO_X$ being produced by power system 10, a performance of reduction catalyst 30, a desired amount of urea that should be sprayed by injection device 34 into the exhaust flow, and/or other similar control parameters. Controller 44 may then regulate operation of injection device 34 such that the desired amount of urea is sprayed into the exhaust flow upstream of catalyst substrate 32.

Controller 44 may embody a single or multiple microprocessors, field programmable gate arrays (FPGAs), digital signal processors (DSPs), etc. that include a means for controlling an operation of power system 10 in response to signals received from the various sensors. Numerous commercially available microprocessors can be configured to perform the functions of controller 44. It should be appreciated that controller 44 could readily embody a microprocessor separate from that controlling other non-exhaust related power system functions, or that controller 44 could be integral with a general power system microprocessor and be capable of controlling numerous power system functions and modes of operation. If separate from the general power system microprocessor, controller 44 may communicate with the general power system microprocessor via datalinks or other methods. Various other known circuits may be associated with controller 44, including power supply circuitry, signal-conditioning circuitry, actuator driver circuitry (i.e., circuitry powering solenoids, motors, or piezo actuators), communication circuitry, and other appropriate circuitry.

Constituent sensor 46 of control system 20 may embody a cross-sensitive constituent sensor configured to generate a signal indicative of the presence of a particular constituent and of reductant within the exhaust flow. For instance, constituent sensor 46 may be a $NO_X$ sensor configured to determine an amount (i.e., quantity, relative percent, ratio, etc.) of NO and/or $NO_2$ present within the exhaust of power system 10, and to also determine an amount of $NH_3$ present within the exhaust. Constituent sensor 46 may be configured to generate a signal indicative of these amounts and send the signal to controller 44. In the depicted embodiment, constituent sensor 46 is located downstream of catalyst substrate 32 and upstream of oxidation catalyst 42. It is contemplated, however, that constituent sensor 46 may alternatively or additionally be located downstream of oxidation catalyst 42, if desired.

The performance of reduction catalyst 30 may be monitored by way of temperature sensor(s) 48 and flow meter 50. Temperature sensor(s) 48 may be located anywhere within exhaust system 18 to generate one or more signals indicative of an operating temperature of reduction catalyst 30 (more specifically, of catalyst substrate 32). In one example, temperature sensor 48 may be located upstream of catalyst substrate 32. In another example, temperature sensor 48 may be located in contact with or downstream of catalyst substrate 32. Flow meter 50 may embody any type of physical or virtual sensor utilized to generate a signal indicative of an exhaust flow rate through reduction catalyst 30. The temperature and/or flow rate signals may be utilized by controller 44 to determine a reducing capacity of reduction catalyst 30. That is, based on known dimensions and age of reduction catalyst 30, based on the measured temperature and flow rate of exhaust passing through reduction catalyst 30, and based on a known reduction injection rate, a performance of reduction catalyst 30 may be predicted.

Figure 2:
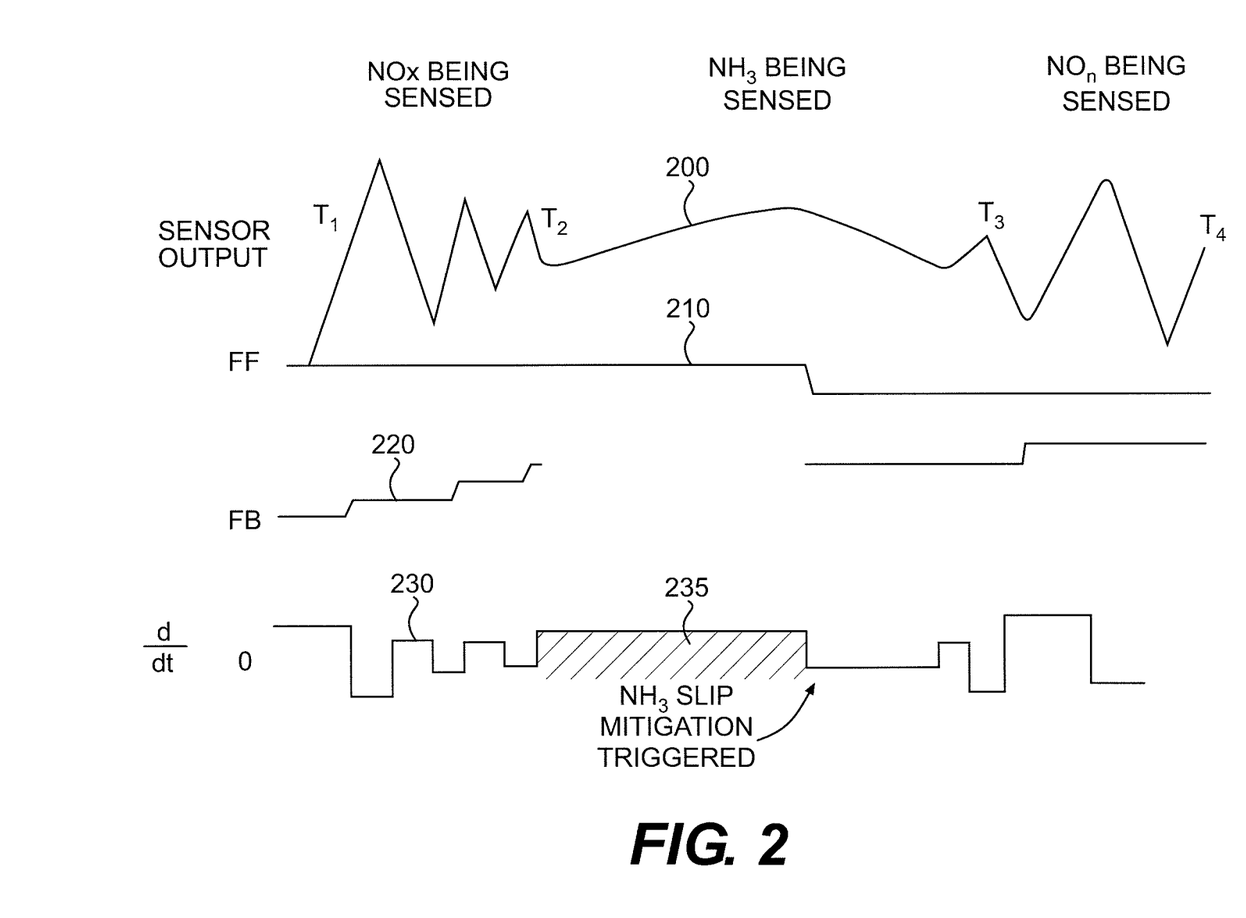
FIG. 2 is a graph depicting an exemplary operation of the power system of FIG. 1.

As illustrated in the graph of FIG. 2, the signal from constituent sensor 46, as represented by a curve 200, may vary over time to reflect varying levels of $NO_X$ and $NH_3$ sensed in the exhaust flow of power system 10. Curve 200 may be divided into three distinct periods of time, including a first time period bounded by times T1 and T2, a second time period bounded by times T2 and T3, and a third period of time bounded by times T3 and T4. As can be seen from FIG. 2, the value of the signal from constituent sensor 46 changes rapidly during the first and third time periods, but much slower and smoother during the second time period. These different rates of change of the signal from constituent sensor 46 have been found to correspond with the particular substance that constituent sensor 46 is sensing. Specifically, the first and third time periods, when the rate of change of the signal from constituent sensor 46 is fast and erratic, correspond with constituent sensor 46 sensing $NO_X$ in the exhaust gas of power system 10. In contrast, the second time period, when the rate of change of the signal from constituent sensor 46 changes in a slower and smoother manner, corresponds with constituent sensor 46 sensing $NH_3$ in the exhaust gas of power system 10.

A second curve 210 shown in FIG. 2 corresponds with a feedforward control parameter that may be used by controller 44 to regulate operation of injection device 34. Controller 44 may determine a theoretical amount of reductant that should be injected to reduce the $NO_X$ produced by power system 10 to an acceptable level. This theoretical amount of reductant may be determined based on a current operation of power system 10 (e.g., based on a current engine speed and/or load) and the predicted performance of reduction catalyst 30, based on measured or calculated conditions of catalyst 30, or based on other parameters known in the art. In one example, controller 44 may reference the current operation of power system 10 and predicted performance of reduction catalyst 30 with a relationship map stored in memory thereof to determine the desired amount of reductant that should be injected. In another example, controller 44 may reference a catalyst temperature and an exhaust flow rate or engine fueling and measured $NO_X$ levels with the relationship map to determine the desired amount of reductant. These maps may include any collection of data in the form of tables, graphs, and/or equations (e.g., regression equations, neural network models, decision or binary tree models, physics equations that describe a system, etc.) that represents the desired relationship.

A third curve 220 shown in FIG. 2 corresponds with a feedback control parameter that may be used by controller 44 to adjust the theoretical injection amount described above based on actual performance parameters sensed downstream of reduction catalyst 30 by constituent sensor 46. That is, after an initial reductant injection of the theoretical quantity determined above, controller 44, via constituent sensor 46, may determine an actual $NO_X$ production and/or an actual performance of reduction catalyst 30, and adjust future reductant injections accordingly such that a desired reduction of $NO_X$ may be accurately achieved. For example, if the amount of $NO_X$ monitored by constituent sensor 46, after injection of the theoretical amount of reductant stipulated by the feedforward control parameter, exceeds a threshold level, controller 44 may provide feedback to injection device 34 to increase the amount of urea injected into passage 26 and further reduce $NO_X$ within reduction catalyst 30. In contrast, if the amount of $NO_X$ monitored by constituent sensor 46 is below a threshold level or if the monitored amount of $NH_3$ in passage 26 is excessive, less urea may be requested in an attempt to conserve urea and/or to extend the useful life of oxidation catalyst 42.

A fourth curve 230 shown in FIG. 2 corresponds with a first derivative of the first curve 210. That is, the fourth curve 230 illustrates the slope of the first curve 210 at any instance in time. The hatched section 235 of the fourth curve 230 is representative of a weighted sum of time during which the slope of the first curve 210 remains within a particular range, starting at time T2. This weighted sum of time may be calculated as a function of an absolute value of the slope of the signal from constituent sensor 46 and a flow rate of exhaust passing through reduction catalyst 30. When the weighted sum becomes greater than a threshold amount (i.e., when the slope of the signal from constituent sensor 46 remains at about the same value or changes little for an extended period of time), controller 44 may determine that constituent sensor 46 is sensing $NH_3$ and responsively trigger a mitigation procedure.

Figure 3:
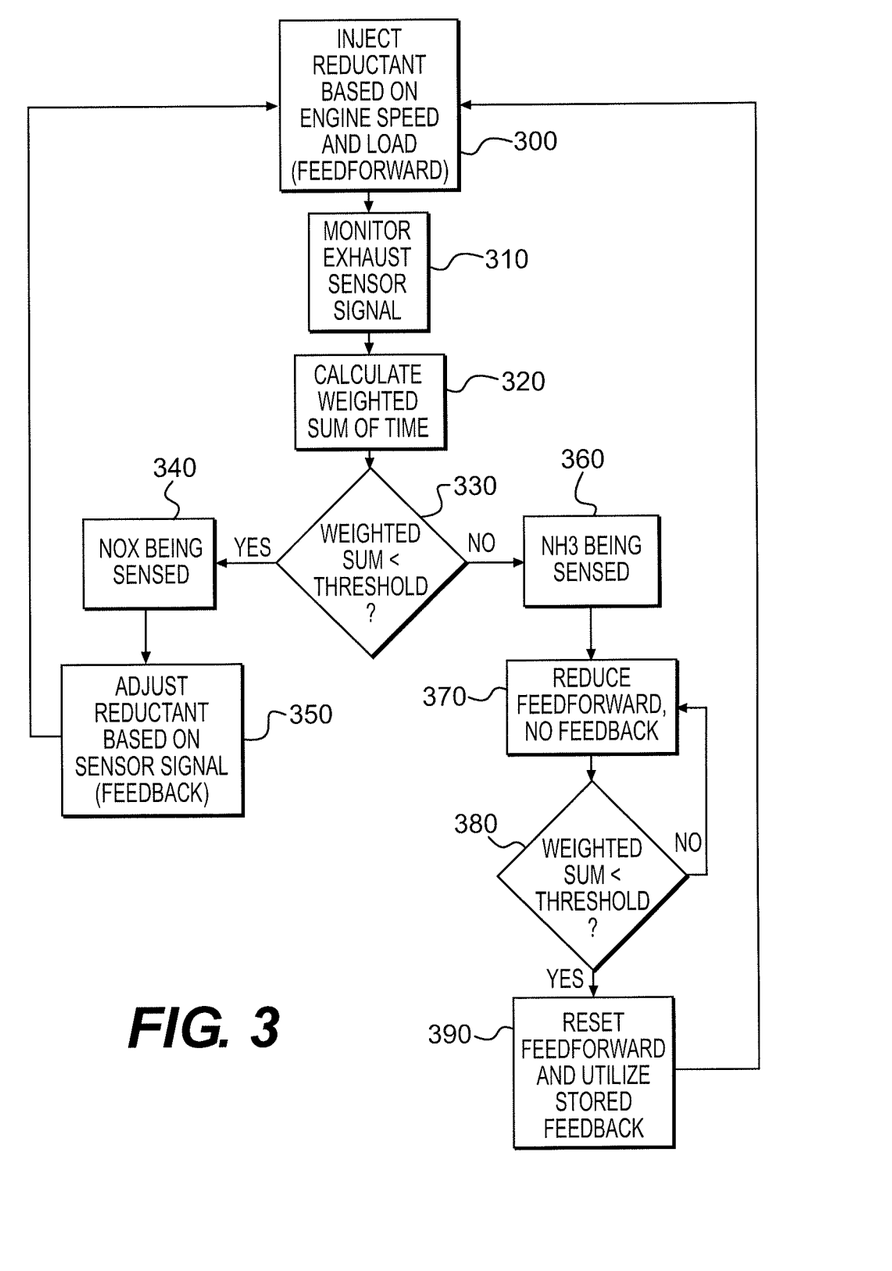
FIG. 3 is a flow chart depicting an exemplary method that may be performed by the power system of FIG. 1.

FIG. 3 illustrates an exemplary method of controlling power system 10. FIG. 3 will be discussed in more detail in the following section to further illustrate the disclosed concepts.

INDUSTRIAL APPLICABILITY

The exhaust system of the present disclosure may be applicable to any power system having a reduction catalyst, where precise control of reductant injections is important. Injection control may be improved by selectively utilizing both feedforward and feedback control parameters based on levels of $NO_X$ and $NH_3$ that are detected by a cross-sensitive sensor. Operation of power system 10 will now be described.

Referring to FIG. 1, air induction system 16 may pressurize and force air or a mixture of air and fuel into combustion chambers 14 of power system 10 for subsequent combustion. The fuel and air mixture may be combusted by power system 10 to produce a mechanical work output and an exhaust flow of hot gases. The exhaust flow may contain a complex mixture of air pollutants composed of gaseous material, which can include oxides of nitrogen ($NO_X$). As this $NO_X$-laden exhaust flow is directed from combustion chambers 14 through oxidation catalyst 40, some NO in the flow may be converted to $NO_2$.

After passing through oxidation catalyst 40, the exhaust flow may be directed toward reduction catalyst 30, where the $NO_X$ may be reduced to water and diatomic nitrogen. Prior to reaching reduction catalyst 30, controller 44 may determine the theoretical amount of reductant required for reduction catalyst 30 to sufficiently reduce the $NO_X$ produced by power system 10 (feedforward control). Then, based on previously measured performance parameters from constituent sensor 46, the theoretical amount of reductant may be adjusted for the current injection event (feedback control).

After reduction within catalyst 30, the exhaust may pass through oxidation catalyst 42 to the atmosphere. Within oxidation catalyst 42, any extra ammonia may be reduced to innocuous substances.

During operation of power system 10, constituent sensor 46 may sense both $NO_X$ and $NH_3$. In order for injection device 34 to be properly controlled and inject the correct amount of reductant into passage 26, controller 44 should know which substance ($NO_X$ or $NH_3$) constituent sensor 46 is currently sensing. Controller 44 may determine this information by analyzing the fourth curve of FIG. 2. In particular, by monitoring the rate of change (i.e., the slope) of the signal from constituent sensor 46, controller 44 may be able to determine if constituent sensor 46 is sensing $NO_X$ or $NH_3$. If sensor 46 is sensing $NO_X$, appropriate feedback control can be implemented to sufficiently reduce the $NO_X$ to desired levels. If constituent sensor 46 is sensing $NH_3$, too much reductant has been injected and an appropriate mitigation procedure should be implemented.

As shown in the flowchart of FIG. 3, after an initial injection of reductant based on the feedforward control parameter described above (Step 300), controller 44 may monitor the signal from constituent sensor 46 (Step 310). Controller 44 may calculate the weighted sum of time during which the slope of the signal from constituent sensor 46 remains within a particular range (Step 320). As described above, the weighted sum of time may be a summation of time that is weighted based on the absolute value of the slope of the signal and a flow rate of exhaust passing through reduction catalyst 30. The weighted sum may be represented by the hatched area 235 shown in FIG. 2 between the times T2 and T3. The weighting used to calculate the weighted sum of time may be different and calibrated for each particular power system 10.

Controller 44 may compare the weighted sum with a threshold amount to determine what substance constituent sensor 46 is sensing (Step 330). The threshold amount may be fixed and based on a desired concentration of $NH_3$ sensed downstream of reduction catalyst 30. If the weighted sum is less than the threshold amount, controller 44 may conclude that constituent sensor 46 is currently monitoring $NO_X$ (or insignificant levels of $NH_3$) (Step 340), and adjust injection device 34 according to the feedback control parameter described above (Step 350). This condition may correspond with the period from time T1 to time T2 shown in FIG. 3. However, if at step 330, the weighted sum is greater than the threshold amount, controller 44 may conclude that constituent sensor 46 is currently sensing $NH_3$, that too much $NH_3$ has been injected into passage 26, and that only negligible amounts of $NO_X$ are currently present (Step 360). This condition may correspond with the period between time T2 and T3, after the hatched time period 235 has summed. At this point in time, controller 44 may implement the mitigation strategy to try and reduce the amount of $NH_3$ within passage 26.

To reduce the amount of $NH_3$ within passage 26, controller 44 may inhibit use of the feedback control parameter and simultaneously reduce the feedforward control parameter (Step 370). The feedforward control parameter may be reduced by an amount corresponding to the value of the signal from constituent sensor 46, the weighted sum, the threshold amount, and/or other performance parameters of power system 10. It is contemplated that the reduction amount may be found by reference to a relationship map stored in the memory of controller 44, if desired. It should be noted that the reduction in the feedforward control parameter should only be partial (i.e., the feedforward control parameter should not be completely inhibited) so that catalyst substrate 32 does not develop localized areas without any reductant. At this point in time, although the feedback control parameter may not be utilized during implementation of the mitigation strategy, the value of the feedback control parameter determined at the start of the mitigation strategy may be stored in memory and implemented after completion of the mitigation strategy, as will be explained in more detail below. It is contemplated that, instead of completely stopping all feedback control, feedback control may instead by reduced, if desired.

As controller 44 reduces the feedforward control parameter (and the feedback control parameter is inhibited), the value of the signal from constituent sensor 46 may begin to gradually decrease. During this time, the concentration of $NH_3$ in passage 26 may decrease until the remaining $NH_3$ is insufficient to completely reduce all $NO_X$ being discharged into passage 26 from combustion chambers 14. At this point in time, constituent sensor 46 may switch from sensing $NH_3$ to sensing $NO_X$, and the value and slope of the signal from constituent sensor 46 may suddenly increase and begin to fluctuate rapidly. This condition may correspond with time T3 in FIG. 2.

Once the value and slope of the signal from constituent sensor 46 begin to fluctuate rapidly, the weighted sum calculated by controller 44 may begin to fall below the threshold amount. At this point in time, if controller 44 compares the weighted sum to the threshold amount (Step 380) and the weighted sum is still above the threshold amount, control may return to step 360. Otherwise, controller 44 may conclude that constituent sensor 46 is once again sensing $NO_X$ and end the mitigation strategy. Alternatively or additionally, controller 44 may be configured to determine an end to NH₃ slip based on an elapsed period of time after the start of slip mitigation and/or based on another triggering condition such as an exhaust temperature or signal value from sensors 46, if desired. When controller 44 concludes that constituent sensor 46 is once again sensing NO$_X$, controller 44 may reset the feedforward control parameter (i.e., raise the feedforward control parameter back to the theoretical value) and implement the previously stored feedback control parameter (Step 390). Control may then return to step 300.

It is contemplated that controller 44 may also be configured to implement a diagnostic procedure based on a frequency of constituent sensor 46 sensing NH₃. For example, controller 44 may be configured to count a number of times that constituent sensor 46 is determined to be sensing NH₃ within a specified time period and, when the number of times exceeds a predetermined number, controller 44 may trigger the diagnostic procedure. The diagnostic procedure could include, among other things, providing an operator of power system 10 with a warning or recommendation; logging a fault condition; implementing a sensor, injection device, and/or catalyst substrate test; or another similar action.

Several advantages may be associated with power system 10. For example, because controller 44 may determine what substance is being sensed by constituent sensor 46 without having to inject additional test doses of reductant into passage 26, the responsiveness and efficiency of power system 10 may be maintained. In particular, the signals already generated by constituent sensor 46 may be utilized to determine the sensitivity of constituent sensor 46 and no additional and time-consuming routines are required. Further, little or no reductant may be wasted in the determination, thereby maintaining the efficiency of power system 10.

It will be apparent to those skilled in the art that various modifications and variations can be made to the system of the present disclosure without departing from the scope of the disclosure. Other embodiments will be apparent to those skilled in the art from consideration of the specification and practice of the system disclosed herein. For example, in addition to or instead of feedback control, exhaust system may be selectively regulated to reduce or increase NO$_X$ production via turbocharger (i.e., VGT, wastegate, bypass, EGR, etc.) control, engine fueling, throttling, etc. In addition, although this disclosures describes operation of a cross-sensitive NO$_X$ sensor, the concepts disclosed herein may be just as applicable to an NH₃ or other type of sensors. Further, it is contemplated that particular enabling conditions may be required before the method of FIG. 3 may be implemented, for example, a threshold temperature of catalyst 30 may first be achieved, a minimum NOx sensor threshold first achieved, and/or a threshold exhaust flow value first achieved, as these requirements may help reduce a frequency of "false positives" of ammonia slip under conditions where no or little reductant has been injected. It is intended that the specification and examples be considered as exemplary only, with a true scope of the disclosure being indicated by the following claims and their equivalents.

What is claimed is:

1. An exhaust system for a combustion engine, comprising:
an exhaust passage;
a reduction catalyst disposed within the exhaust passage;
an injection device configured to inject reductant into the exhaust passage upstream of the reduction catalyst, the reductant selected to facilitate within the reduction catalyst a reduction of an exhaust constituent;
a sensor configured to generate a signal indicative of a concentration of the exhaust constituent and the reductant within the exhaust passage; and
a controller in communication with the sensor and the injection device, the controller being configured to:
calculate a value indicative of a rate of change of the signal for a period of time as a cumulative sum of time weighted based on an absolute value of the rate of change of the signal and a flow rate of exhaust through the reduction catalyst;
make a comparison of the value indicative of the rate of change of the signal for the period of time with a threshold amount;
make a determination of whether the sensor is sensing a concentration of the exhaust constituent or the reductant based on the comparison; and
adjust operation of the injection device based on the determination.

2. The exhaust system of claim 1, wherein the threshold amount is fixed and based on a desired concentration of reductant sensed downstream of the reduction catalyst.

3. The exhaust system of claim 1, wherein the controller is further configured to monitor a speed and a load of the combustion engine, and determine a feedforward control parameter for the injection device based on the speed and load.

4. The exhaust system of claim 3, wherein the controller is further configured to determine a feedback control parameter for the injection device based on the signal when it is determined that the sensor is sensing the concentration of the exhaust constituent.

5. The exhaust system of claim 4, wherein the controller is further configured to inhibit use of the feedback control parameter and reduce the feedforward control parameter when it is determined that the sensor is sensing the concentration of the reductant.

6. The exhaust system of claim 5, wherein the controller is configured to reduce the feedforward control parameter based on a control map stored in a memory of the controller.

7. The exhaust system of claim 6, wherein the controller is configured to only partially reduce the feedforward control parameter.

8. The exhaust system of claim 6, wherein the controller is further configured to reset the feedforward control parameter from the reduced feedforward control parameter when it is determined that the sensor is again sensing the concentration of the exhaust constituent.

9. The exhaust system of claim 1, wherein the controller is further configured to:
track a frequency of the sensor sensing the reductant; and
trigger a diagnostic procedure when the frequency exceeds a threshold frequency.

10. A power system, comprising:
an internal combustion engine configured to combust fuel and generate a flow of exhaust;
an exhaust passage leading from the internal combustion engine to the atmosphere;
an SCR catalyst disposed within the exhaust passage;
an injector configured to inject a urea solution into the exhaust passage upstream of the SCR catalyst, the urea solution selected to facilitate within the SCR catalyst a reduction of NO$_x$;
a sensor disposed within the exhaust passage downstream of the SCR catalyst and configured to generate a signal indicative of a concentration of NO$_x$ and NH₃ within the exhaust passage; and
a controller in communication with the sensor and the injector, the controller being configured to:

calculate a value indicative of a rate of change of the signal for a period of time as a cumulative sum of time weighted based on an absolute value of the rate of change of the signal and a flow rate of exhaust through the SCR catalyst;

determine that the sensor is sensing a concentration of $NO_x$ when the value indicative of the rate of change of the signal for the period of time is less than a threshold amount;

determine that the sensor is sensing a concentration of $NH_3$ when the value of the rate of change of the signal is greater than the threshold amount; and adjust operation of the injector differently depending on whether the sensor is sensing a concentration of $NO_x$ or $NH_3$.

11. A method of operating an exhaust system, comprising:

directing a flow of exhaust from a combustion engine through a reduction catalyst;

injecting reductant into the flow of exhaust to reduce a constituent of the exhaust;

sensing a concentration of the constituent and the reductant and generating a corresponding signal;

calculating a value indicative of a rate of change of the signal for a period of time as a cumulative sum of time weighted based on an absolute value of the rate of change of the signal and a flow rate of exhaust through the reduction catalyst;

making a comparison of the value indicative of the rate of change of the signal for the period of time with a threshold amount;

making a determination of whether the concentration of the constituent or the reductant is currently being sensed based on the comparison; and adjusting the injecting based on the determination.

12. The method of claim 11, wherein the threshold amount is fixed and based on a desired concentration of reductant sensed downstream of the reduction catalyst.

13. The method of claim 11, further including;

monitoring a speed and a load of the combustion engine; and determining a feedforward injection control parameter based on the speed and load.

14. The method of claim 13, further including determining a feedback injection control parameter based on the signal when it is determined that the concentration of the constituent is currently being sensed.

15. The method of claim 14, further including inhibiting use of the feedback injection control parameter and reducing the feedforward injection control parameter when it is determined that the concentration of the reductant is being sensed.

16. The method of claim 15, wherein reducing the feedforward injection control parameter further includes reducing the feedforward injection control parameter based on a relationship map.

17. The method of claim 15, wherein reducing the feedforward injection control parameter further includes only partially reducing the feedforward injection control parameter.

18. The method of claim 15, further including resetting the feedforward injection control parameter from the reduced feedforward injection control parameter when it is determined that the concentration of the constituent is currently being sensed.

* * * * *

UNITED STATES PATENT AND TRADEMARK OFFICE
CERTIFICATE OF CORRECTION

PATENT NO. : 8,769,928 B2  
APPLICATION NO. : 12/891264  
DATED : July 8, 2014  
INVENTOR(S) : Yeager et al.

Page 1 of 1

It is certified that error appears in the above-identified patent and that said Letters Patent is hereby corrected as shown below:

In the Claims

Column 12, line 4, in Claim 13, delete "including;" and insert -- including: --.

Signed and Sealed this
Fifteenth Day of September, 2015

Michelle K. Lee
*Director of the United States Patent and Trademark Office*